(12) United States Patent
Billings et al.

(10) Patent No.: US 8,888,458 B2
(45) Date of Patent: Nov. 18, 2014

(54) TURBOMACHINE ROTOR BALANCING SYSTEM

(75) Inventors: Scott C. Billings, Marlborough, CT (US); Zhen Wu, Niantic, CT (US); Konstantinos P. Giannakopoulos, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 393 days.

(21) Appl. No.: 13/417,454

(22) Filed: Mar. 12, 2012

(65) Prior Publication Data

US 2013/0236310 A1 Sep. 12, 2013

(51) Int. Cl.
*F01D 5/10* (2006.01)

(52) U.S. Cl.
USPC ........................................................ 416/144

(58) Field of Classification Search
USPC ............................ 416/144, 145, 500; 415/119
See application file for complete search history.

(56) References Cited

U.S. PATENT DOCUMENTS

| | | | |
|---|---|---|---|
| 4,220,055 A | 9/1980 | Dubois et al. | |
| 4,485,678 A | 12/1984 | Fanuele | |
| 4,879,792 A | 11/1989 | O'Connor | |
| 5,627,762 A | 5/1997 | Cameron et al. | |
| 5,724,271 A | 3/1998 | Bankert et al. | |
| 6,893,222 B2 | 5/2005 | Allam | |
| 7,377,749 B2 | 5/2008 | Charrier et al. | |
| 7,685,876 B2 | 3/2010 | Mollmann et al. | |
| 8,025,483 B2 | 9/2011 | Blanchard et al. | |
| 2004/0156708 A1 | 8/2004 | Allam | |
| 2006/0245925 A1 | 11/2006 | Brault et al. | |
| 2008/0008589 A1 | 1/2008 | Lee | |
| 2008/0095613 A1 | 4/2008 | Blanchard et al. | |
| 2011/0044816 A1* | 2/2011 | Lecuyer et al. | 416/144 |
| 2011/0078901 A1 | 4/2011 | Glasspoole et al. | |

OTHER PUBLICATIONS

International Search Report and Written Opinion for PCT/US2013/026631, dated Jun. 3, 2013.

* cited by examiner

*Primary Examiner* — Edward Look
*Assistant Examiner* — Maxime Adjagbe
(74) *Attorney, Agent, or Firm* — Bachman & LaPointe, P.C.

(57) ABSTRACT

A turbine rotor balancing system comprises a circumferential array of mounting features. One or more balance weights are each mounted to the respective associated said mounting feature. Each balance weight comprises: a front wall along the forward face of the mounting feature; an aft wall along the aft face of the mounting feature; and a radially inboard wall. One or more fasteners each extend at least partially through holes of the front wall and rear wall of an associated said balance weight and through a hole of the associated said mounting feature. An abutment surface of the rotor is positioned to engage an outboard end of at least one of the front wall and aft wall of each said balance weight to resist outward radial movement of the weight.

20 Claims, 7 Drawing Sheets

TURBOMACHINE ROTOR BALANCING SYSTEM

BACKGROUND

This disclosure relates to balancing of turbine rotors by the addition of weights, and more particularly to rotor flanges to which the weights are mounted.

The dynamic balancing of turbine rotors is a well developed art. Each rotor may have, at one or more longitudinal locations, a circumferential array of mounting features permitting the installation of one or more balance weights.

It is known, for example, to balance a rotor by using a computer controlled apparatus to spin the rotor about its rotational axis and measure the parameters of rotational displacements (vibrations) associated with imbalance. Based upon these measurements, the computer outputs an identification of a particular combination of balance weights to balance the rotor. Specifically, the computer may identify particular weight masses to be installed at one to all of the individual mounting locations defined by the mounting features.

A number of different mounting feature constructions are known. An axially-protruding flange is shown in U.S. Pat. No. 6,893,222 of Allam. Other implementations involve radially inwardly projecting flanges.

SUMMARY

One aspect of the disclosure involves a turbine rotor balancing system comprising a circumferential array of mounting features. Each mounting feature has a forward face, an aft face, an inboard end, and a mounting hole between the forward face and aft face. One or more balance weights are each mounted to the respective associated said mounting feature. Each balance weight comprises: a front wall along the forward face of the mounting feature and having a hole; an aft wall along the aft face of the mounting feature and having a hole; and a radially inboard wall inboard of the mounting feature inboard end. One or more fasteners each extend at least partially through the holes of the front wall and rear wall of an associated said balance weight and through the hole of the associated said mounting feature. An abutment surface of the rotor is positioned to engage an outboard end of at least one of the front wall and aft wall of each said balance to resist outward radial movement of the weight.

In additional or alternative embodiments of any of the foregoing embodiments, the rotor may be a gas turbine engine rotor, more particularly a compressor rotor, and yet more particularly, a low pressure compressor rotor.

In additional or alternative embodiments of any of the foregoing embodiments, the circumferential array of mounting features may comprise any circumferential array of locations along a single flange or a circumferential array of radially inwardly projecting tongues.

In additional or alternative embodiments of any of the foregoing embodiments, there may be a front said abutment surface engaging the front wall and an aft said abutment surface engaging the aft wall.

In additional or alternative embodiments of any of the foregoing embodiments, each said fastener may be a rivet. In additional or alternative embodiments of any of the foregoing embodiments, there may be a plurality of said balance weights.

In additional or alternative embodiments of any of the foregoing embodiments, the abutment surface may comprise an inboard end of a radially inwardly projecting abutment flange. In additional or alternative embodiments of any of the foregoing embodiments, there may be a plurality of relieved areas in the abutment flange. Each relieved area may be radially aligned with the mounting hole of an associated said mounting feature. In additional or alternative embodiments of any of the foregoing embodiments, at least one said relieved area may accommodate the head of an associated button weight, the button weight having a shank extending through the associated mounting hole.

In additional or alternative embodiments of any of the foregoing embodiments, at least one button-head counter rivet extending through the hole of an associated said mounting feature and having a head accommodated in a radial relief in the abutment flange. In additional or alternative embodiments of any of the foregoing embodiments, the inboard wall of the balance weight is spaced apart from the inboard end of the mounting feature by a gap. In additional or alternative embodiments of any of the foregoing embodiments, the tongue extends directly from an inboard surface of a rim of a disk.

In additional or alternative embodiments of any of the foregoing embodiments, a method for using the system may comprise: rotating the rotor about an axis; measuring vibrational parameters of the rotating rotor; and installing said one or more balance weights to improve the balance of the rotor. In additional or alternative embodiments of any of the foregoing embodiments, there may be a rotating the rotor to cause engagement of the installed balance weights to the abutment surface.

In additional or alternative embodiments of any of the foregoing embodiments, the abutment surface may comprise an inboard end of a radially inwardly projecting abutment flange; there may be a plurality of relieved areas in the abutment flange, each relieved area radially aligned with the mounting hole of an associated said mounting feature; and the installing may comprise: inserting a button weight so that a said relieved areas accommodates a head of said button weight, the button weight having a shank extending through the associated mounting hole.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
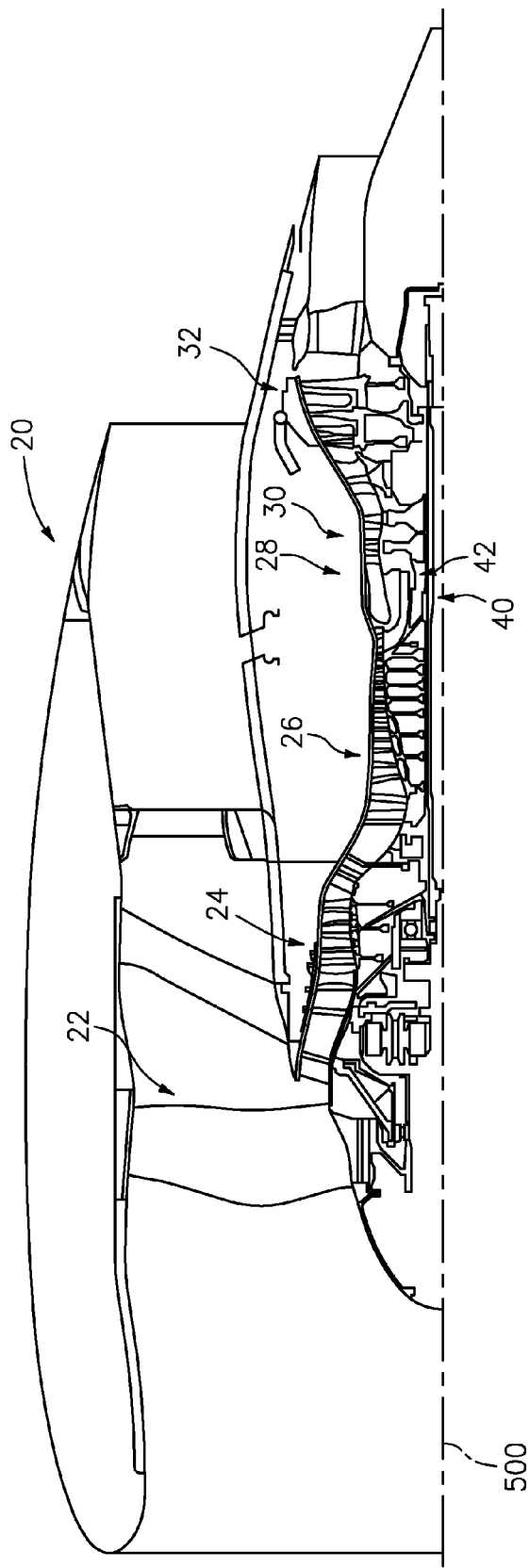
FIG. 1 is a partial, partially schematic longitudinal sectional view of a turbofan engine.

FIG. 1 shows an exemplary turbomachine as a turbine engine, namely a turbofan engine 20. The exemplary engine 20 has a centerline or central longitudinal axis 500. From forward to aft and upstream to downstream, the engine comprises various sections including a fan 22, a low pressure compressor (LPC) 24, a high pressure compressor (HPC) 26, a combustor 28, a high pressure turbine (HPT) 30, and a low pressure turbine (LPT) 32. Each of the LPC, HPC, HPT, and LPT comprise multiple stages of blades interspersed with associated stages of vanes. The blade stages of the LPC are coupled to the blade stages of the LPT via a shaft 40 to be driven by the LPT. Similarly, the blade stages of the HPC are coupled to the blade stages of the HPT via a shaft 42. The LPT and LPC blade stages and their associated shaft may form a low pressure spool. Similarly, the HPC and HPT blade stages and their associated shaft may form a high pressure spool. The spools may be mounted for rotation about the centerline 500 via bearing systems (not shown). The rotating portions of the LPC, HPC, HPT, and LPT may form associated rotors.

Figure 2:
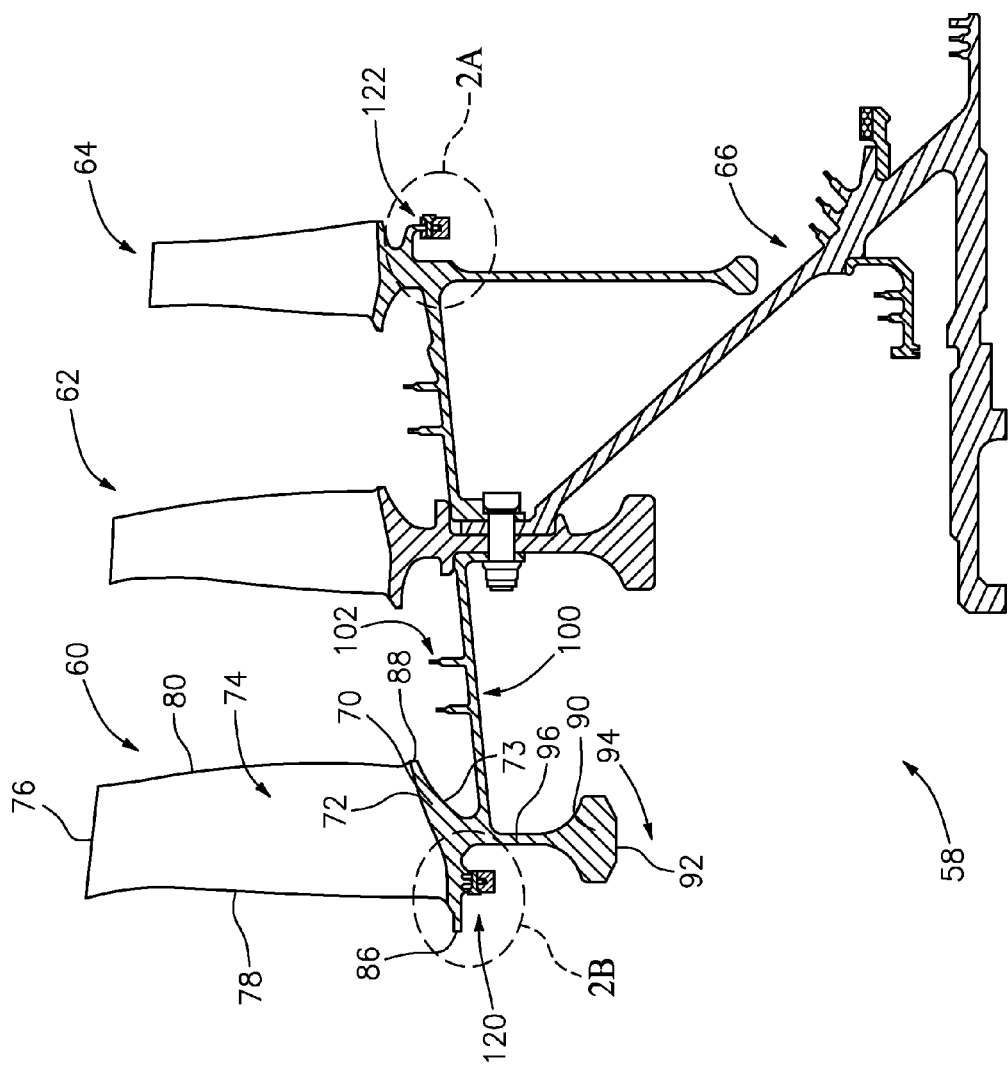
FIG. 2 is a partial longitudinal sectional view of a portion of a low pressure compressor (LPC) rotor of the engine of FIG. 1.

FIG. 2 shows a portion of the LPC rotor 58 comprising three blade stages 60, 62, and 64 and an associated hub 66. Each exemplary blade stage is formed by an exemplary single piece disk. Each exemplary disk is formed out of an alloy (e.g., a titanium alloy or aluminum alloy) such as via machining. Each exemplary disk comprises an essentially full hoop rim structure 70 having an outboard/outer diameter (OD) surface/face 72 and an inboard/inner diameter (ID) surface/face 73. The disk further comprises a circumferential array of blade airfoils 74 extending from inboard ends at the rim 70 to outboard ends or tips 76. The exemplary airfoils each further extend from a leading edge 78 to a trailing edge 80 and have respective pressure sides and suction sides. The disk rim structure 70, itself has forward and aft rim surfaces or extremities 86 and 88.

Each exemplary disk further includes an inboard/inner diameter (ID) annular protuberance or "bore" 90 having an inboard/inner diameter (ID) surface 92 defining a central aperture 94. The bore 90 is connected to the rim via an annular radial web 96 and provides structural integrity when the disk is under centrifugal load. In the exemplary implementation, the disk of the upstreammost first blade stage 60 further includes a rearwardly-extending sealing sleeve/spacer 100 which has a distal end bolted (via a bolt circle) to the web of the second stage disk. A pair of annular sealing edges 102 extend radially outward from the OD surface of the sleeve to engage seals of the intervening vane stage. A similar sleeve/spacer extends forward from the disk of the third blade stage. The exemplary hub 66 has an outboard flange similarly bolted to the second stage disk for transmitting torque from the LPT thereto.

To balance the rotor, the rotor includes one or more places for mounting balance weights. In an exemplary implementation, a first location 120 is along the first stage rim; whereas, the second location 122 is along the third stage rim. As is discussed further below, the second location 122 features one of several conventional balancing systems.

Figure 2A:
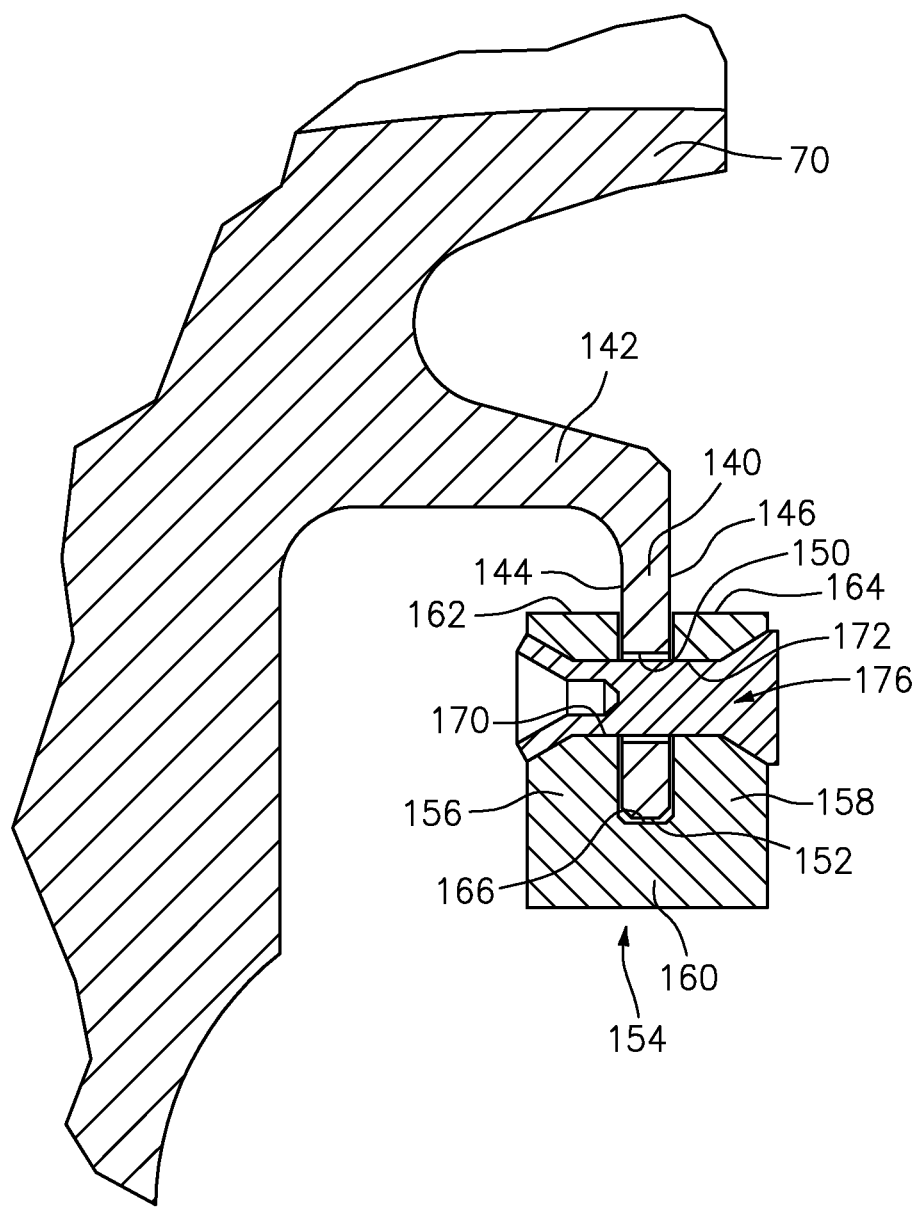
FIG. 2A is an enlarged view of an aft balancing location of the rotor of FIG. 2.

The location 122 comprises a radially inwardly-directed flange 140 (FIG. 2A) extending inward from the distal end of a sleeve 142. The sleeve 142, in turn, extends aft and inward from an underside of the rim 70. As is known in the art, the flange 140 may be partially scalloped or segmented to define individual tongues between the scallops. This segmentation reduces circumferential stress associated with balance weight mounting holes 150.

The flange 140 has a forward surface/face 144 and an aft surface/face 146 between which the holes 150 extend. In the exemplary scalloped flange, the inner diameter (ID) rim surface of the flange forms inboard ends 152 of the tongues. At one or more of these holes 150, a conventional saddle weight 154 may be mounted. The exemplary saddle weight is generally U-shaped in longitudinal cross-section comprising a front wall 156 and an aft wall 158. An inboard wall 160 joins the front and aft walls and defines a channel therebetween which receives the flange.

The front and aft walls have respective outboard ends 162 and 164. The inboard wall 160 has an upper surface 166 along the channel (forming a base of the channel) contacting the tongue inboard end 152. The front and aft walls have respective apertures 170 and 172 therethrough. An attachment rivet 176 extends through the apertures 170 and 172 and hole 150 to mount the weight to the flange.

In use, a user may have access to a number of different sizes (masses) of such saddle weights dimensioned for use with a given flange. A computer spin balancing method may involve the computer controlling rotation of the rotor on a balancing machine and measuring vibratory forces. Based on the measured forces, the computer instructs the user to put one or more weights of given mass(s) at given tongue(s). The user does this and rivets the weight(s) to the tongue(s). Thus, one or more of the tongues of the flange may have weights mounted thereto and the weights may have different masses. Exemplary weight materials are metallic (e.g., stainless steel). One example involves twelve mass increments with the smallest weights having an average mass of 1.851 gram and the largest having an average mass of 4.434 grams. Thus an exemplary range of such increments provides a largest mass at least twice the smallest mass.

In operation, as the rotor rotates, the centrifugal loading of the weight is borne by the interaction between the tongue end 152 and channel base 166. In a static, at rest condition, the tongue end and channel base may be slightly spaced apart, contacting only under load. To facilitate this, there may be enough static play between the rivet shank and tongue hole.

The securing of the weight to the tongue may alter the frequency response of the tongue. An unweighted tongue may have a given frequency response (e.g., one or more resonance frequencies). The existence of such resonance frequencies creates design/engineering considerations. For example, it is desirable to avoid having such resonance frequencies coincident with resonance frequencies of the airfoils of the blades of the associated disk so as to avoid adverse effects of coupling.

The presence of such a conventional saddle weight 154 alters the effective frequency response of the tongue to which it is mounted (increasing the mass, etc.). The more possible weights usable on a tongue, the more possible resonance frequencies that must be considered. Exemplary such balancing systems may use in excess of five different masses of such saddle weights (e.g., 10-12 exemplary different masses). This may be supplemented by smaller weights in the form of one or more different button rivet weights (e.g., discussed below).

Figure 2B:
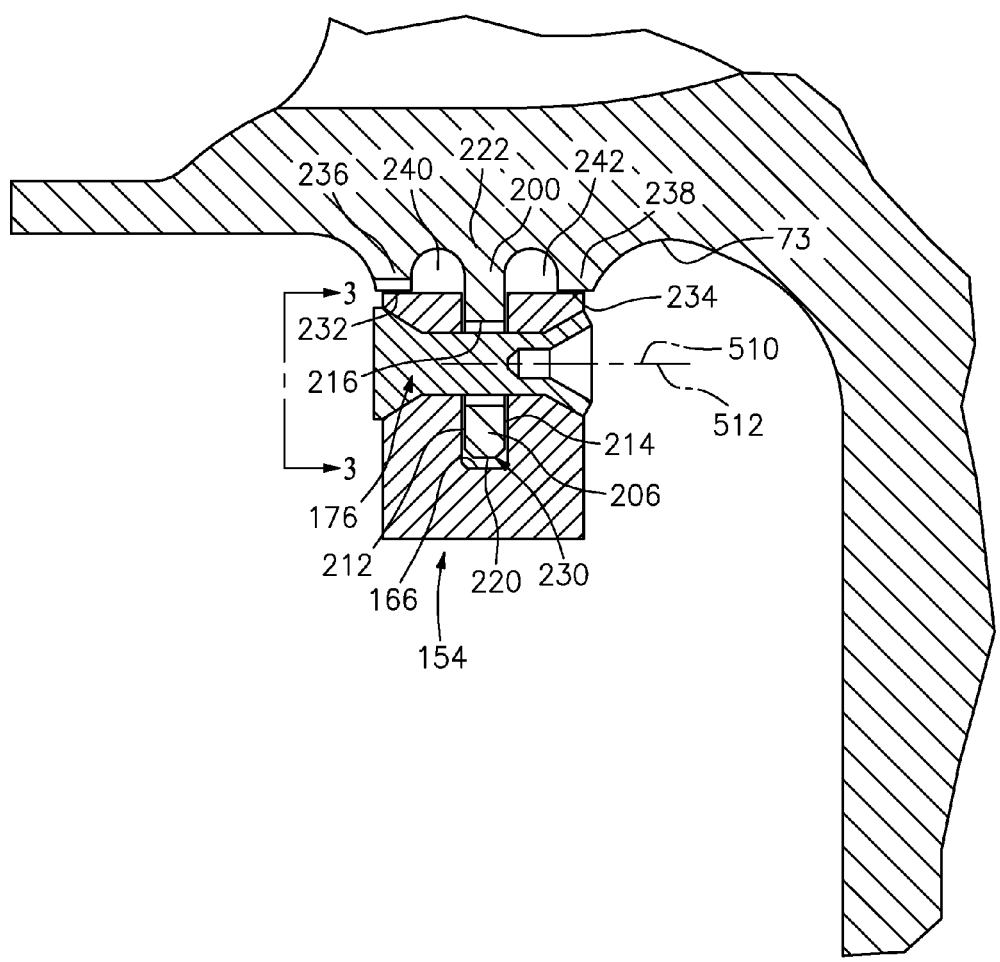
FIG. 2B is an enlarged view of a forward balancing location of the rotor of FIG. 2.

The impact of such resonance becomes more significant when the tongues are close to the airfoils. FIG. 2B shows the forward balancing location 120 wherein a flange 200 is immediately along the underside 73 (inboard surface) of the rim of the first stage disk just forward of the web and immediately below the leading edge of the associated airfoils. This physical proximity of flange to airfoils greatly increases the potential significance of resonant behavior.

Figure 3:
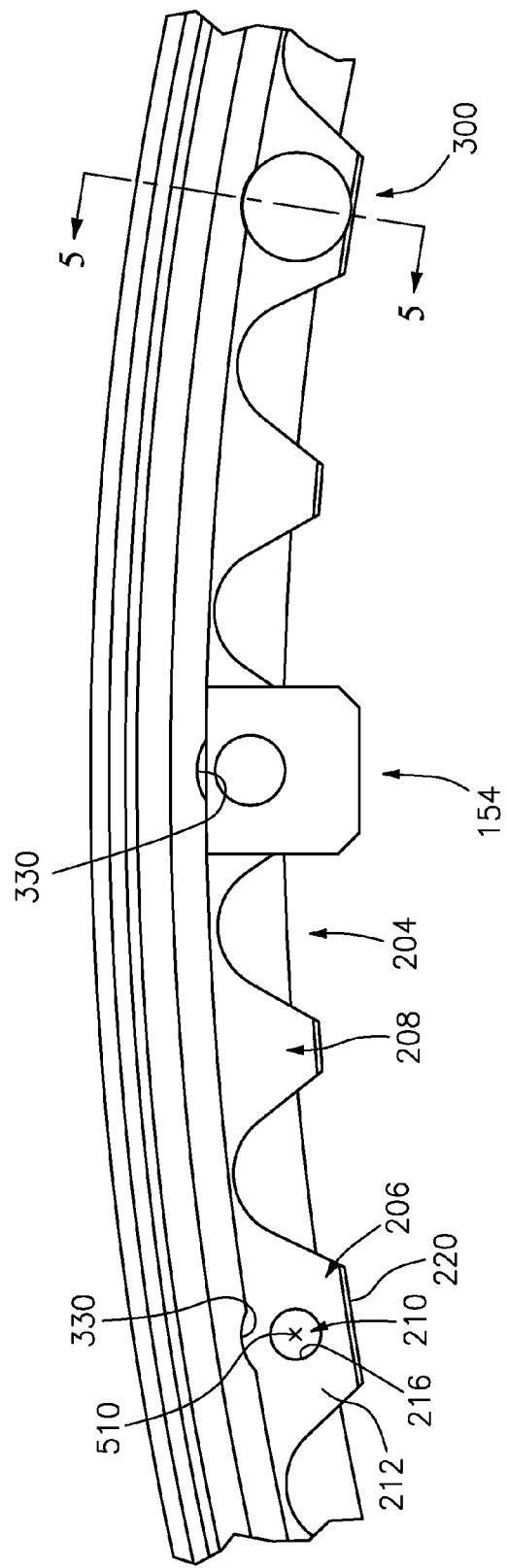
FIG. 3 is a partial aftward view of the forward balancing location.
Figure 4:
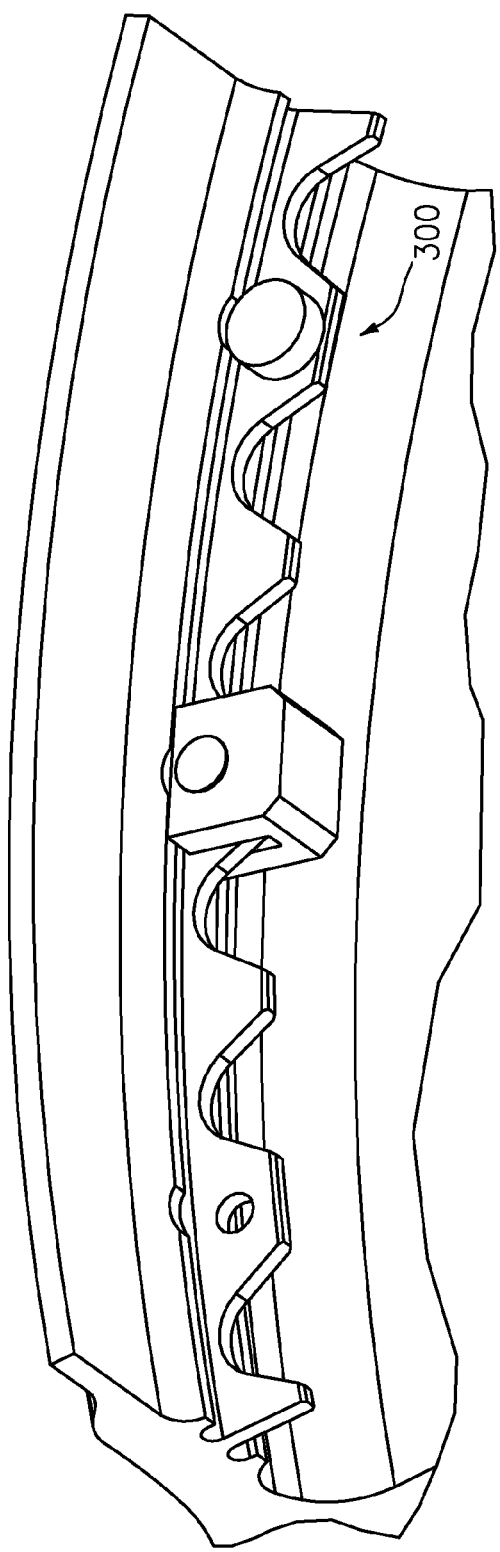
FIG. 4 is a partial view of the forward balancing location.
Figure 5:
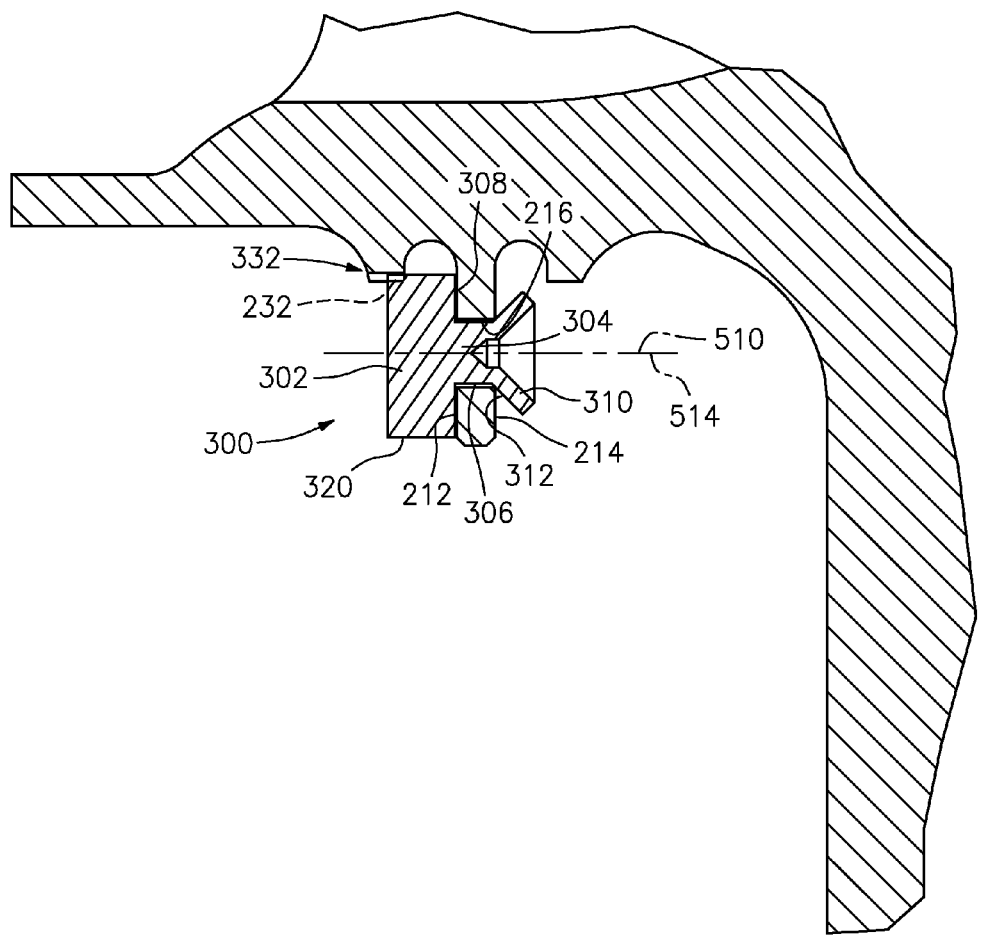
FIG. 5 is a partial longitudinal sectional view of the forward balancing location, taken along line 5-5 of FIG. 3.

The exemplary flange 200 has a circumferential array of scallops 204 (FIG. 3) dividing the flange into interspersed circumferential arrays of first tongues 206 and second tongues 208. The exemplary first tongues 206 form weight mounting features/locations having associated mounting apertures/holes 210 extending between a forward surface 212 of the associated tongue and an aft surface 214 (FIG. 2B) thereof. Each of the holes has an exemplary axis 510. The exemplary holes 210 are defined by their perimeter surfaces 216. FIGS. 2B and 3 further show inboard ends 220 of the tongues (e.g., as annular cylindrical segments beveled at fore and aft junctions with the respective surfaces 212 and 214).

FIG. 2B also shows an outboard root portion 222 of the flange and its tongues. FIGS. 2B and 3 further show a saddle weight 154 at one such mounting location. An exemplary rotor has in excess of twenty such mounting locations. In a typical balancing situation, a small number of them will contain balance weights (e.g., 1-10). The exemplary balance weight 154 is a conventional saddle balance weight. However, additional modifications might be made. The exemplary attachment rivet 176 may be an otherwise conventional attachment rivet. Exemplary saddle weight bodies consist essentially of a metallic substrate (e.g., optionally coated). Exemplary substrate materials are metallic (e.g., stainless steel) and may be more dense than a density of the adjacent rotor material. Similarly, exemplary attachment rivets are metallic (e.g., nickel alloy such as AMS 7232). With the exemplary conventional weight 154, however, the tongue 206 may be deliberately radially foreshortened or otherwise configured to provide a gap 230 by which the inboard end 220 is radially spaced apart from the channel base or inboard wall upper surface 166 in a normal range of operation.

To provide radial support for the weight 154 under centrifugal loading (i.e., to resist outward radial movement of the weight), the exemplary balance location 120 has one or more abutment surfaces 232, 234 for engaging the outboard end surfaces/rims 162, 164 of at least one of the front wall 156 and aft wall 158 of the balance weight 154. The exemplary abutment surfaces are formed as the inboard rims of radially inwardly extending flanges 236 (forward/fore) and 238 (aft/rear) projecting inward from the rim underside 73 (separated from the flange 200 by associated inwardly facing/open annular grooves/channels 240, 242, respectively). In an alternative, there are no grooves/channels 240, 242 so that the abutment surfaces are merely a longitudinally widened root portion of the flange 200.

To allow the abutment surfaces to bear the centrifugal loads, the exemplary hole 210 may be slightly oversized (e.g., defining an annular gap surrounding the shank of the rivet). The exemplary FIG. 2B neutral condition shows the shank (axis 512) and hole 210 (axis 510) to be coaxial. However, there may be departures from this either statically or under load. Furthermore, non-circular holes are also possible. This allows the rivet to avoid taking any centrifugal shear load.

By having the abutment surfaces rather than the tongue bear the circumferential loads, the effect of the weights 154 on the resonance frequencies of the tongues are reduced. This greatly simplifies design/engineering considerations by limiting the possible resonance frequencies to be avoided (e.g., allowing the tongue to be easily designed so that its unweighted resonance frequencies do not match those of the airfoils).

The exemplary weights have channel dimensions that are effective so that when installed with corresponding rivet tightness are in light frictional contact with the respective faces of the associated tongue. This light frictional contact may provide a damping and avoidance of rattling while not affecting the majority of radial load transmission.

FIG. 3 also shows a conventional button weight 300 mounted at another of the mounting locations. The exemplary button weight 300 has a generally cylindrical head 302 and a shank 304. An exemplary button weight 300 consists essentially of a unitary metallic substrate (e.g., optionally coated) such as a nickel alloy (e.g., AMS 5665). This may be more dense than the density of the adjacent rotor material. The shank 304 extends through the associated hole 210 and has a perimeter/side surface 306 contacting the hole perimeter surface 206 to radially retain the button weight. In the exemplary embodiment, the head has an underside 308 along the front surface 212. A deformed distal end portion 310 of the shank has an underside 312 clamping the weight against the aft surface 214. The exemplary hole and shank axes 510 and 514 are coincident. The exemplary head 302 has a lateral perimeter surface 320 (e.g., cylindrical). To accommodate the head, the exemplary forward abutment flange 236 has associated relieved areas (radial reliefs) 330 (FIG. 3). In one example, a plurality of different masses of button weight are available sharing shank dimensions and head diameters but differing in mass and head length. In an exemplary implantation the button weights have a range of masses lower than and not overlapping with the range of masses of the saddle weights. In one implementation, a smallest button weight has an average mass of 0.454 gram while a largest weight has a mass of 0.794 gram. Thus an exemplary range of button weights has a largest mass at least 50% higher than a smallest.

The FIG. 3 example shows a weight 300 of sufficient mass and head length so that, in the installed/mounted condition, the head 302 of the weight 300 is partially accommodated in the associated relieved area 330. In certain further examples, the combination may be sufficiently close so that, under centrifugal load, the head contacts the surface of the relieved area to be radially supported thereby. This radial support would correspondingly reduce the torque applied by the button weight to the mounting flange and thereby reduce load on the mounting flange. For lighter weights 300, the head may be short enough to be clear of the relieved area 330 when installed but may be accommodated by (pass through) the relieved area during insertion/installation.

The exemplary shank 304 may have, along a majority of its length, sufficient radial clearance relative to the mounting hole so as to accommodate an anticipated range of differential thermal expansion (so as to avoid interference between the shank and the hole and thereby avoid associated stresses). The engagement may be borne by the deformed distal end portion whose thinned section may provide sufficient mechanical flexibility to accommodate differential thermal expansion with relatively small engagement forces.

The relieved areas 330 may be formed via drilling/boring (e.g., at the same time as the drilling/boring of the holes 210 or before or after). The exemplary boring is of sufficient diameter to provide a slight radial gap 332 between the head 302 and the abutment flange 236. This also leaves the abutment surface engaging any weight 154 as two distinct circumferentially spaced surface portions on either circumferential side of the recess 330.

In an exemplary process of manufacture for the first stage, the gross features are machined (e.g., turned) out of a titanium alloy billet. In one or more stages, this may machine all the rotationally symmetric features. The perimeter of the billet may then be machined to define the individual airfoils. The holes 210 and recesses 330 may, in turn, be machined. In one example, machining may otherwise be the same as conventionally used to machine a rotor with a turning step forming the ID at the flange 200. A subsequent turning step may define the ID of the flanges 236 and 238 and the channels separating them from the flange 200. The various rivet holes may be machined (e.g., using a back tapered end mill). The recesses 330 may than be machined. The recesses 204 may also be machined. The edges of the rivet holes and other features may then be broken.

An exemplary balancing procedure involves: assemble the rotor stack together and place it in the balance machine (not shown); 2. spin to a balancing speed (e.g., 900 rpm); 3. measure (and record) balance (e.g., angle and amount of unbalance); 4. optionally repeat the spinning/measuring/recording one or more times for an average; apply weight(s) to correct measured (or avg. measured) imbalance (e.g., based upon computer or manual look-up table or computed best weight combination for a given imbalance); re-spin and re-measure balance; if balance not within target apply further weights to correct (may be done after additional re-spins/re-measurings to provide an average and may include replacing a given weight if more or less mass is indicated for a given weight position); once balance is within target, discontinue and remove from machine.

In various implementations, this may involve merely modifying an existing manufacturing process via including the forming of the abutment flanges 236, 238 in the same step or sequence of steps as the main flange 200 and adding the formation of the recess 330.

One or more embodiments have been described. Nevertheless, it will be understood that various modifications may be made. For example, when implemented in the reengineering of a given engine rotor configuration, details of the existing configuration may influence details of any particular implementation. Accordingly, other embodiments are within the scope of the following claims.

What is claimed is:

1. A turbomachine rotor balancing system comprising:
a circumferential array of mounting features, each mounting feature having:
a forward face;
an aft face;
an inboard end; and
a mounting hole between the forward face and aft face;
one or more balance weights, each balance weight mounted to a respective associated said mounting feature and comprising:
a front wall along the forward face of the mounting feature and having a hole;
an aft wall along the aft face of the mounting feature and having a hole; and
a radially inboard wall inboard of the mounting feature inboard end;
one or more fasteners, each said fastener extending at least partially through the holes of the front wall and rear wall of an associated said balance weight and through the hole of the associated mounting feature; and
an abutment surface of the rotor positioned to engage an outboard end surface of at least one of the front wall and aft wall of each said balance weight to resist outward radial movement of the balance weight.

2. The system of claim 1 wherein:
the circumferential array of mounting features comprises a circumferential array of locations along a single flange.

3. The system of claim 1 wherein:
the circumferential array of mounting features comprises a circumferential array of radially inwardly projecting tongues.

4. The system of claim 1 wherein:
there is a front said abutment surface engaging the front wall and an aft said abutment surface engaging the aft wall.

5. The system of claim 1 wherein:
each said fastener is a rivet.

6. The system of claim 1 wherein:
there are a plurality of said balance weights.

7. A turbomachine rotor balancing system comprising:
a circumferential array of mounting features, each mounting feature having:
a forward face;
an aft face;
an inboard end; and
a mounting hole between the forward face and aft face;
one or more balance weights, each balance weight mounted to a respective associated said mounting feature and comprising:
a front wall along the forward face of the mounting feature and having a hole;
an aft wall along the aft face of the mounting feature and having a hole; and
a radially inboard wall inboard of the mounting feature inboard end;
one or more fasteners, each said fastener extending at least partially through the holes of the front wall and rear wall of an associated said balance weight and through the hole of the associated mounting feature; and
an abutment surface of the rotor positioned to engage an outboard end of at least one of the front wall and aft wall of each said balance weight, wherein:
the abutment surface comprises an inboard end of a radially-inwardly projecting abutment flange.

8. The system of claim 7, wherein:
there are a plurality of relieved areas in the abutment flange, each relieved area radially aligned with the mounting hole of an associated said mounting feature.

9. The system of claim 8, wherein:
one or more said relieved areas accommodate a head of an associated button weight, the button weight having a shank extending through the associated mounting hole.

10. The system of claim 7, further comprising:
at least one button-head counter rivet extending through the hole of an associated said mounting feature and having a head accommodated in a radial relief in the abutment flange.

11. The system of claim 1, wherein:
the inboard wall of the balance weight is spaced apart from the inboard end of the mounting feature by a gap.

12. The system of claim 1, wherein:
the circumferential array of mounting features extends directly from an inboard surface of a rim of a disk.

13. The system of claim 1, wherein:
the rotor is a rotor of a gas turbine engine.

14. The system of claim 1, wherein:
the rotor is a compressor rotor of a gas turbine engine.

15. The system of claim 1, wherein:
the rotor is a low pressure compressor rotor of a gas turbine engine.

16. A method for using the system of claim 1, the method comprising:
rotating the rotor about an axis;
measuring vibrational parameters of the rotating rotor; and
installing said one or more balance weights to improve the balance of the rotor.

17. The method of claim 16 further comprising:
rotating the rotor to cause engagement of the installed balance weights to the abutment surface.

18. The method of claim 16 wherein:
the abutment surface comprises an inboard end of a radially-inwardly projecting abutment flange;
there are a plurality of relieved areas in the abutment flange, each relieved area radially aligned with the mounting hole of an associated said mounting feature; and the installing comprises:
  inserting a button weight so that a said relieved areas accommodates a head of said button weight, the button weight having a shank extending through the associated mounting hole.

19. A turbomachine rotor comprising:
  a circumferential array of balance weight mounting features, each mounting feature having:
    a forward face;
    an aft face;
    an inboard end; and
    a mounting hole between the forward face and aft face;
  a forward radially inwardly projecting abutment flange spaced immediately ahead of the circumferential array of mounting features; and
  an aft radially inwardly projecting abutment flange spaced immediately aft of the circumferential array of mounting features.

20. The rotor of claim 19 wherein:
  at least one of said forward radially inwardly projecting abutment flange and aft radially inwardly projecting abutment flange has a plurality of radial reliefs respectively circumferentially aligned with an associated said mounting hole.

* * * * *